United States Patent
Yang

(10) Patent No.: US 7,444,444 B2
(45) Date of Patent: Oct. 28, 2008

(54) MESSAGE PROCESSING SYSTEM AND METHOD USING EXTERNAL STORAGE

(75) Inventor: Won-Jong Yang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 202 days.

(21) Appl. No.: 11/407,088

(22) Filed: Apr. 20, 2006

(65) Prior Publication Data
US 2007/0028016 A1   Feb. 1, 2007

(30) Foreign Application Priority Data
Aug. 1, 2005   (KR)   ............ 10-2005-0070398

(51) Int. Cl.
*G06F 3/00* (2006.01)
*G06F 13/00* (2006.01)

(52) U.S. Cl. .................. 710/52; 710/310

(58) Field of Classification Search ............ 710/52–61, 710/72–74, 308–310; 711/170
See application file for complete search history.

(56) References Cited

U.S. PATENT DOCUMENTS

| | | | | |
|---|---|---|---|---|
| 5,067,077 A | * | 11/1991 | Wakimoto et al. | 711/163 |
| 5,640,604 A | * | 6/1997 | Hirano | 710/56 |
| 5,797,042 A | * | 8/1998 | Gaylord | 710/56 |
| 5,845,153 A | * | 12/1998 | Sun et al. | 710/56 |
| 5,862,257 A | * | 1/1999 | Sekine et al. | 382/199 |
| 6,816,929 B2 | * | 11/2004 | Ueda | 710/56 |
| 6,973,555 B2 | * | 12/2005 | Fujiwara et al. | 711/170 |
| 2007/0028016 A1 | * | 2/2007 | Yang | 710/52 |

\* cited by examiner

*Primary Examiner*—Christopher B. Shin
(74) *Attorney, Agent, or Firm*—Robert E. Bushnell, Esq.

(57) ABSTRACT

The invention relates to a message processing system and method using an external storage medium. Upon receiving a message, the system and method examine the status of a first internal memory. If the first internal memory has an insufficient reserved space, the message is automatically stored in the external storage medium, and a second internal memory is generated to store a newly added message in the second internal memory while loading the message stored in the external storage medium in the first internal memory.

10 Claims, 5 Drawing Sheets

MESSAGE PROCESSING SYSTEM AND METHOD USING EXTERNAL STORAGE

CLAIM OF PRIORITY

This application makes reference to, incorporates the same herein, and claims all benefits accruing under 35 U.S.C. §119 from an application for MESSAGE PROCESSING SYSTEM AND METHOD USING EXTERNAL STORAGE earlier filed in the Korean Intellectual Property Office on 1 Aug. 2005 and there duly assigned Ser. No. 10-2005-0070398.

BACKGROUND OF THE INVENTION

1. Technical Field

The present invention relates to a message processing system and method using an external storage medium.

2. Related Art

Describing message processing in a communication program, a linked list is a structure that is used when data is divided into several messages in which their number is dynamically added instead of being fixed. In such a structure, a message indicates a next message, and when a new message is added, the last message of existing messages indicates the new message.

However, in a communication program with a difference in message receiving and processing rates, if one message is received and processed before reading a next message, performance deteriorates.

Therefore, in order to improve performance, a message addition thread is separated from a message processing thread, with a buffer mediating between the message addition and processing threads. The processing thread processes messages by periodically examining whether or not the buffer contains a message therein.

However, if messages are accumulated in the buffer for a long period of time, the process does not operate due to memory shortage so that, upon having added a predetermined quantity of messages, the message addition thread discards a message instead of adding it to the buffer, or records it as a file for processing it later.

That is, conventionally, it has been required to determine the number of messages to be stored in the buffer beforehand in order to determine whether a message to be added by the thread should be added to memory of the buffer or to an external storage.

Furthermore, conditions as to whether the message-processing thread has read a message from the memory or has processed a message written in the external storage should have been realized by developers who make the thread that adds the message instead of the buffer.

Also, the message processing thread should have determined whether or not a message exists in the external storage in addition to the buffer before reading and processing the message, if any. The function of bringing a file name written in external storage should have been realized separately.

Moreover, there is a drawback in that the function of using the external storage is realized in the processing thread which uses the buffer such that the same function is not easily reused by another system.

SUMMARY OF THE INVENTION

The present invention has been made to solve the foregoing problems of the prior art, and it is therefore an object of the present invention to provide a message processing system and method using an external storage medium, which system and method themselves determine whether or not a memory in a buffer is available to automatically store a message in the external storage medium while processing messages without differentiating a message read by a message-processing thread from the memory from that read from the external storage medium.

According to an aspect of the invention for realizing the above objects, a message processing system using an external storage medium comprises a message processor which, upon receiving a message, examines the status of a first internal memory. If the first internal memory has an insufficient reserved space, the processor automatically stores the message in the external storage medium, and then generates a second internal memory to store a newly added message in the second memory while loading the message stored in the external storage medium in the first internal memory.

Preferably, the message processor comprises: a message receiver for receiving the message transmitted from a message transmission processor; a buffer which examines the status of the first internal memory upon receiving the message from the message receiver and, if the first internal memory has an insufficient reserved space, automatically stores the received message in the external storage medium; and a message processor for processing the message stored in the external storage medium by loading the stored message in the first internal memory.

Preferably, the buffer comprises: a memory for storing the message transmitted from the message receiver; a location information memory for storing location information of the message stored in the external storage medium; and a controller for examining the status of the memory upon receiving the message from the message receiver and, if the memory has an insufficient reserved space, automatically storing the received memory in the external storage medium.

Preferably, if a message exists in the buffer, the message processor locks an existing buffer pointer which indicates address information of the buffer, and generates a new buffer pointer.

Preferably, the message processor allocates a new buffer to the locked existing buffer pointer, and unlocks the existing buffer pointer to store the message in the new buffer.

Preferably, the message processor processes a message existing in the buffer by referring to the new buffer pointer, and by processing the message stored in the external storage medium by sequentially reading the stored message.

According to another aspect of the invention for realizing the above objects, a message processing system using an external storage medium comprises: a message receiver for receiving a message transmitted from a message transmission processor; a buffer which, upon receiving the message from the message receiver, examines the status of the internal memory and, if the internal memory has an insufficient reserved space, automatically stores the received message in the external storage medium; and a message processor for processing the message stored in the external storage medium by reading the stored message into the internal memory of the buffer.

According to another aspect of the invention for realizing the above objects, a message processing method using an external storage medium comprises the steps of: examining the status of an internal memory of a buffer upon receiving a message and, if the internal memory has an insufficient reserved space, automatically storing the received message in the external storage medium; and processing the message stored in the external storage medium by loading the stored message in the internal memory.

Preferably, the message-processing step comprises: if a message exists in the buffer, locking an existing buffer pointer that indicates an address information of the buffer, and generating a new buffer pointer; allocating a new buffer to the locked existing buffer pointer, and unlocking the existing buffer pointer to store the message in the new buffer; and processing the message in the buffer by referring to the generated new buffer pointer, and then processing the message stored in the external storage medium by sequentially reading the stored message.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
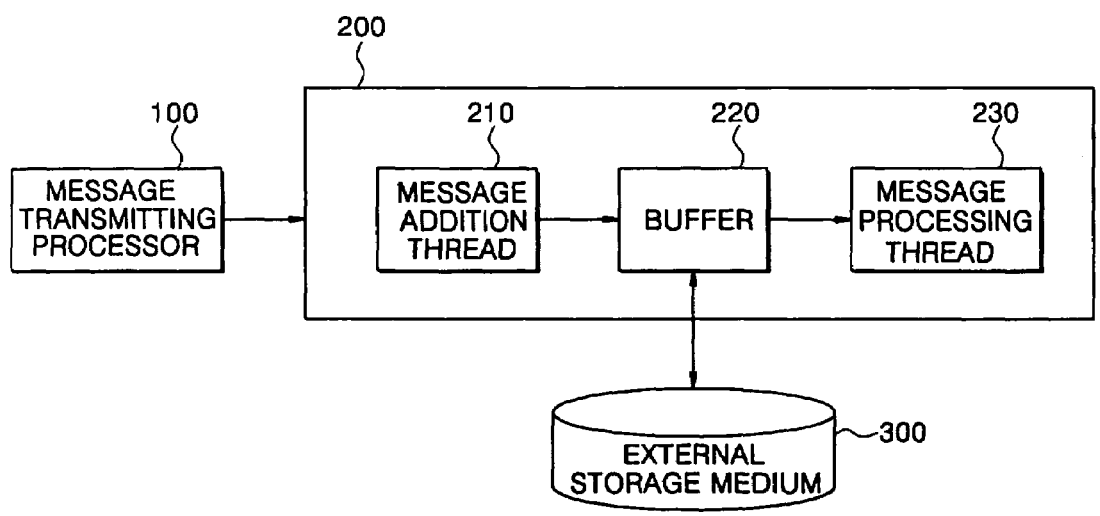
FIG. 1 is a block diagram illustrating a message processing system using an external storage medium of the invention.

Hereinafter preferred embodiments of the invention will be described with reference to the accompanying drawings, in which the same reference numerals are used throughout the different drawings to designate the same or similar components. In the following detailed description of the invention, well-known functions or constructions will not be described in detail since they would unnecessarily obscure the understanding/concept of the invention.

Figure 2:
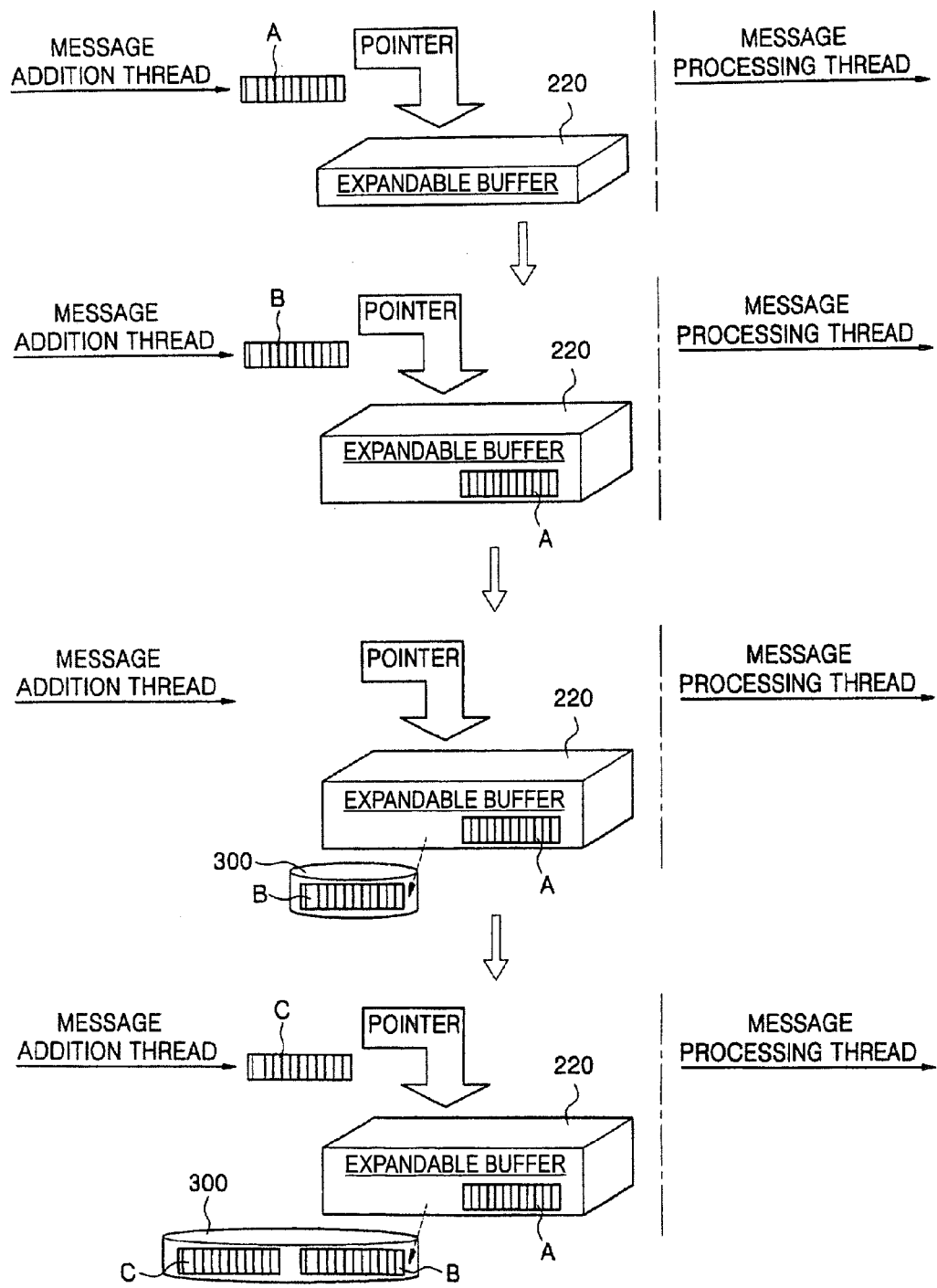
FIG. 2 is a block diagram illustrating a process in which a buffer shown in FIG. 1 determines the status of a memory so as to add a message.
Figure 3:
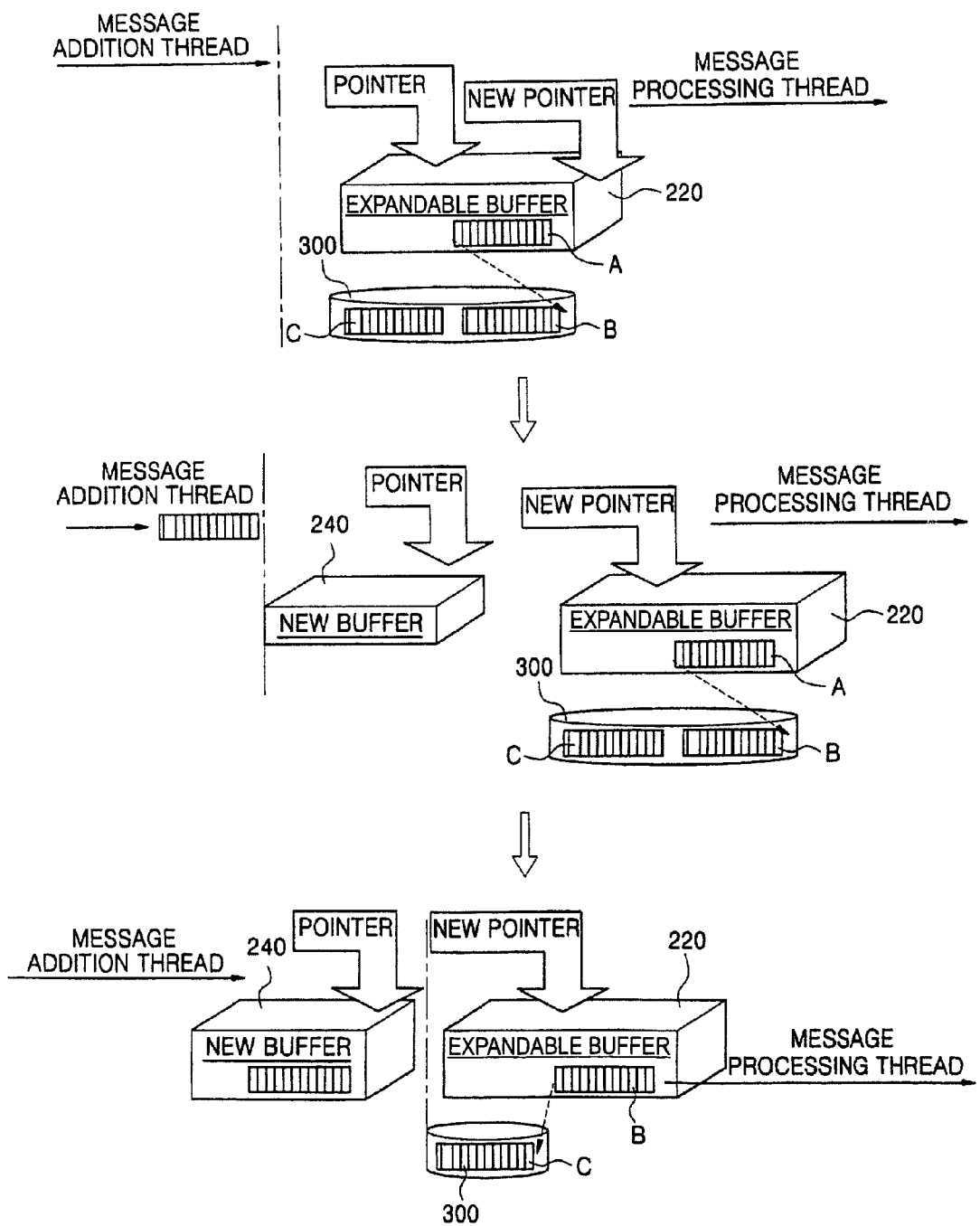
FIG. 3 is a block diagram illustrating a process in which a process thread shown in FIG. 1 generates a new pointer so as to add and process a message.

FIG. 1 is a block diagram illustrating a message processing system using an external storage medium of the invention, FIG. 2 is a block diagram illustrating a process in which a buffer shown in FIG. 1 determines the status of a memory so as to add a message, and FIG. 3 is a block diagram illustrating a process in which a process thread shown in FIG. 1 generates a new pointer so as to add and process a message.

As shown in FIG. 1, the message processing system of the invention includes a message transmitting processor 100, a message receiving processor 200, and an external storage medium 300.

The message transmitting processor 100 is provided outside the message receiving processor 200, and functions to transmit messages to the message receiving processor 200.

The message receiving processor 200 receives messages transmitted from the transmitting processor 100.

The message receiving processor 200 includes a message addition thread 210, a buffer 220 and a message processing thread 230.

The message addition thread 210 receives a message from the message transmitting processor 100, and transmits the received message to the buffer 220.

The buffer 220, upon receiving a message A transmitted from the message addition thread 210, determines whether or not internal memory is available. If internal memory is available, the buffer 220 adds the received message A to the memory.

Thereafter, if it is determined that the internal memory has exhausted its capacity and thus is unavailable any longer, the buffer 220 automatically stores a newly received message B in the external storage medium 300 instead of storing it in the internal memory.

Furthermore, once the received message is automatically stored in the external storage medium 300, when a message C is added, the buffer 220 unconditionally stores the message C in the external storage medium 300 without examining the status of the internal memory.

In particular, in the case of access to the external medium 300, the buffer 220 stores messages in or reads messages from the external medium 300 with reference to the location information of a message bundle of several messages or the location information of a file.

The message processing thread 230 functions to process messages to be stored in the buffer 220, and examines whether or not there is a message to be processed in the buffer at a predetermined period (e.g., every 0.1 second).

The message addition thread 210 and the message processing thread 230 conduct message addition or processing by referring to a buffer pointer, i.e., a position repository that indicates the address of the buffer 220.

If the examination proves the existence of a message to be processed, the message processing thread 230 locks the buffer pointer indicating the present buffer address before generating a new buffer pointer as shown in FIG. 3.

Then, the message processing thread 230 allocates the new buffer to the locked existing buffer pointer, and then unlocks the existing buffer pointer, so that the unlocked existing buffer pointer indicates the address of a newly allocated buffer.

At the same time, the message processing thread 230 processes messages in the buffer 220 by referring to the new buffer pointer of the existing buffer. That is, the message A stored in the buffer memory is processed first, and then the messages B and C stored in the external storage medium are read and processed in sequence.

The message processing thread 230 cannot recognize the existence of the external storage medium 300, but merely refers to the new buffer pointer of the existing buffer to process the messages in the buffer 220.

When the memory in the buffer 220 is exhausted and thus not available any longer, the external storage medium 300 automatically stores forwarded messages under the control of the buffer 220.

Figure 4:
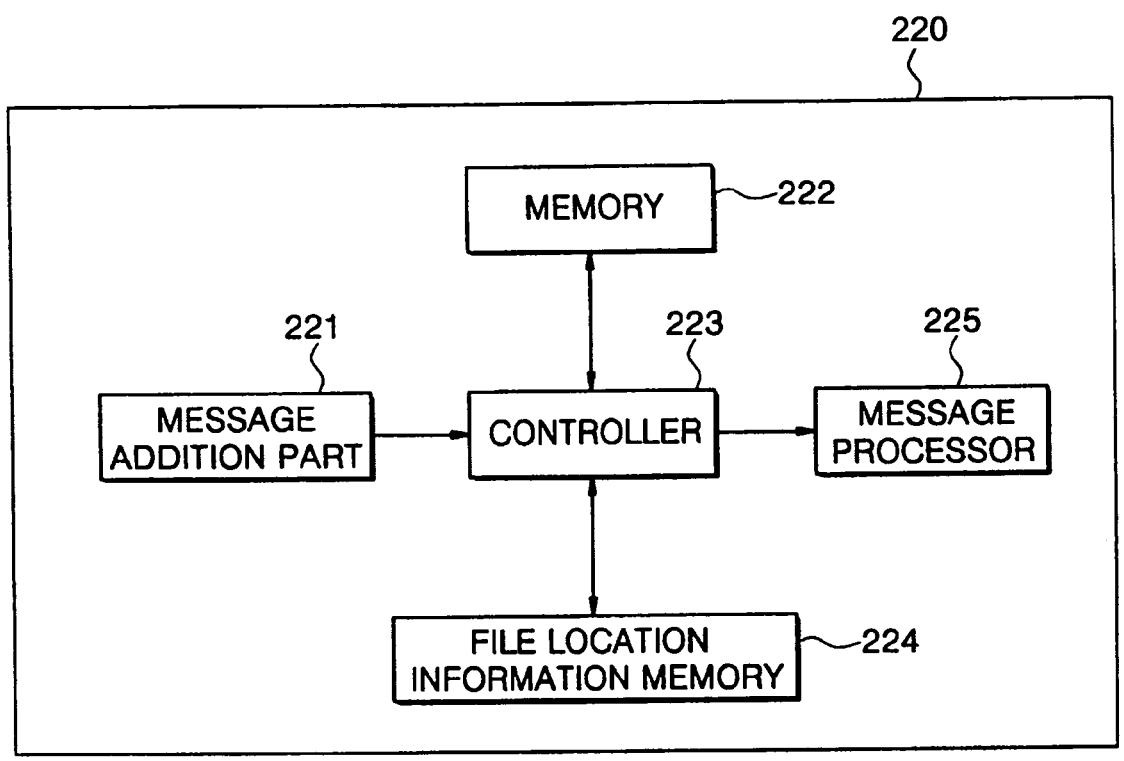
FIG. 4 is a block diagram illustrating the structure of a buffer shown in FIG. 1.

FIG. 4 is a block diagram illustrating the structure of a buffer shown in FIG. 1.

As shown in FIG. 4, the buffer 220 of the invention includes a message addition part 221, a memory 222, a controller 223, a file location information memory 224, and a message processor 225.

The message addition part 221 provides an "add" function for message addition at the request of the message addition thread 210 to receive a message added from the message addition thread 210.

The memory 222 adds a message forwarded from the controller 223.

The controller 223, upon receiving a message forwarded from the message addition part 221, inspects the status of the memory 222. If the memory 222 is available with a reserved memory space, the controller 223 stores the forwarded message to the memory 222.

However, if the memory 222 is not available due to exhaustion, the controller 223 automatically stores the forwarded message in the external storage medium 300.

When the buffer 220 accesses the external storage medium 300 to store a message therein or read a message therefrom, the file location information memory 224 stores file location information, that is, location information relative to a message bundle of several messages to be referred to.

The message processor 225, under the control of the controller 223 receives a message stored in the memory 222 or the external storage medium 300 so as to transmit it to the message processing thread 230.

Figure 5:
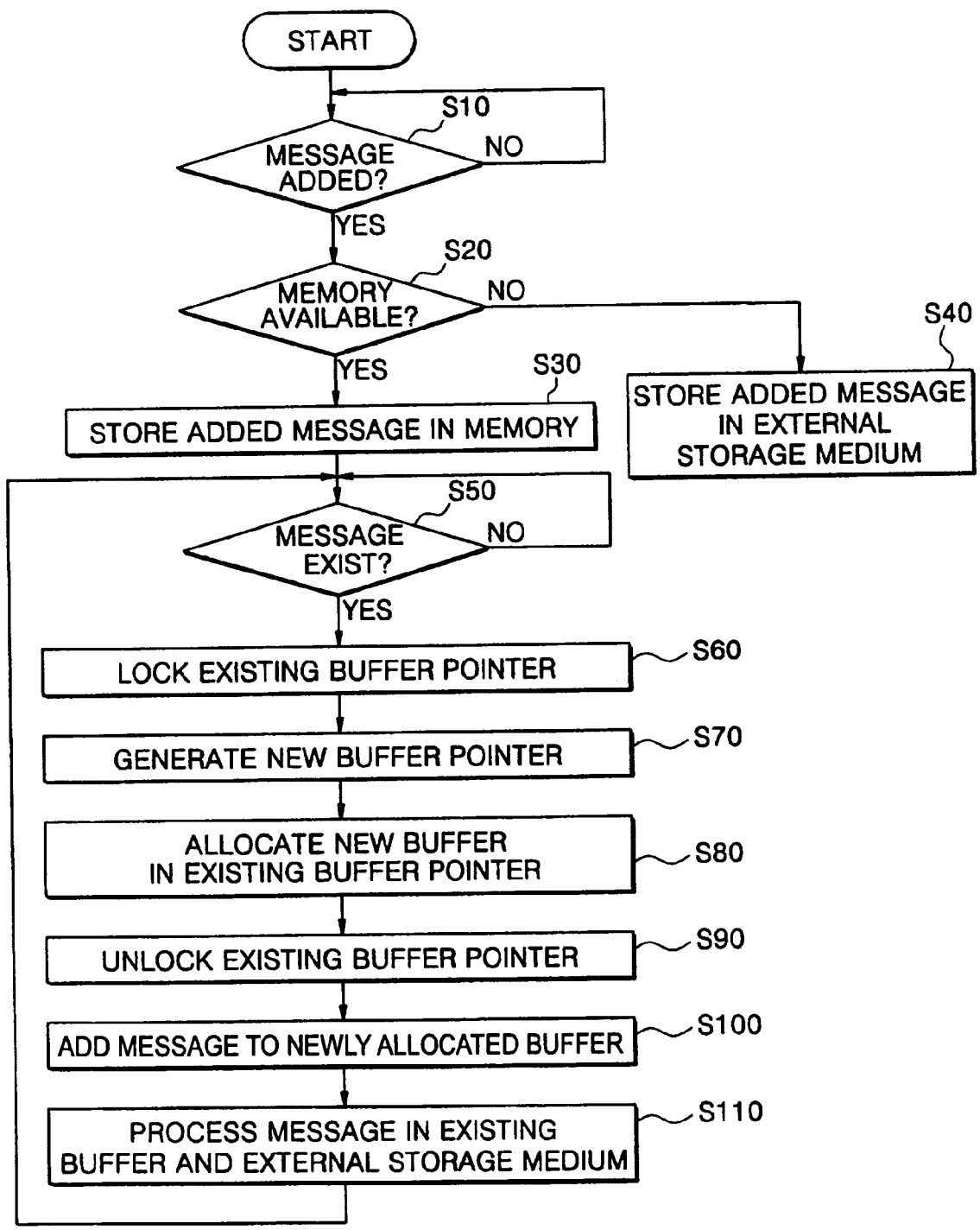
FIG. 5 is a flowchart illustrating message processing using an external storage medium of the invention.

FIG. 5 is a flowchart illustrating message processing using an external storage medium of the invention.

As shown in FIG. 5, the system determines whether or not there is a received message to be newly added in S10. If there is a message to be added, the system inspects the status of the message to confirm whether or not memory is available.

If the memory is available, the system stores the message to be added in the memory 222 in S30. If the memory is exhausted and thus no longer available, the system automatically stores the message in the external storage medium 300 in S40.

Next, in S50, the system determines whether or not a message to be processed exists in the buffer 220. If a message to be processed exists in the buffer 220, the system locks a buffer pointer indicating a current buffer address in S60, and then generates a new buffer pointer in S70.

Thereafter, the system allocates a new buffer to the existing buffer pointer in S80, and unlocks the existing buffer pointer in S90, so that the unlocked existing buffer pointer indicates the newly allocated buffer address.

Next, the system adds the message to the newly allocated buffer address by using the unlocked existing buffer pointer in S100.

Then, the system processes a message in the buffer 220 by referring to the new buffer pointer of the existing buffer in S110. In this case, message processing is executed by sequentially reading and processing a message stored in the memory of the buffer 220, and then a message stored in the external storage medium 300.

As described above, the invention provides a system and a method which by itself can determine whether or not a memory in a buffer is available to automatically store a message in the external storage medium, while processing messages without differentiating a message read by a message-processing thread from the memory from that read from the external storage medium, resulting in more efficient storage and processing of the messages.

The present invention has been described and illustrated with the embodiment of the message processing system using an external storage medium, but is not limited thereto. Rather, the invention can be applied to all systems that process messages by using a buffer.

While the present invention has been shown and described in connection with the preferred embodiments, it will be apparent to those skilled in the art that modifications and variations can be made without departing from the spirit and scope of the invention as defined by the appended claims.

What is claimed is:

1. A message processing system using an external storage medium, comprising a message receiving processor which, upon receiving a message, examines the status of a first internal memory and, if the first internal memory has an insufficient reserved space, automatically stores the message in the external storage medium, and then generates a second internal memory to store a newly added message in the second internal memory while loading the message stored in the external storage medium in the first internal memory;

wherein the message receiving processor comprises:
a message receiver for receiving the message as transmitted from a message transmission processor;
a buffer which examines the status of the first internal memory upon receiving the message from the message receiver and, if the first internal memory has an insufficient reserved space, automatically stores the received message in the external storage medium; and
a message processor for processing the message stored in the external storage medium by loading the stored message in the first internal memory.

2. The message processing system according to claim 1, wherein the buffer comprises:
a memory for storing the message transmitted from the message receiver;
a location information memory for storing location information of the message stored in the external storage medium; and
a controller for examining the status of the memory upon receiving the message from the message receiver and, if the memory has an insufficient reserved space, automatically storing the received message in the external storage medium.

3. The message processing system according to claim 1, wherein, if a message exists in the buffer, the message processor locks an existing buffer pointer that indicates address information of the buffer, and generates a new buffer pointer.

4. The message processing system according to claim 3, wherein the message processor allocates a new buffer to the locked existing buffer pointer, and unlocks the existing buffer pointer so as to store the message in the new buffer.

5. The message processing system according to claim 3, wherein the message processor processes a message existing in the buffer by referring to the new buffer pointer, and processes the message stored in the external storage medium by sequentially reading the stored message.

6. A message processing system using an external storage medium, comprising:
a message receiver for receiving a message transmitted from a message transmission processor;
a buffer which, upon receiving the message from the message receiver, examines a status of an internal memory and, if the internal memory has an insufficient reserved space, automatically stores the received message in the external storage medium; and
a message processor for processing the message stored in the external storage medium by reading the stored message into the internal memory of the buffer;
wherein the buffer comprises:
a memory for storing the message received from the message receiver;
a location information memory for storing location information relative to the message stored in the external storage medium; and
a controller which examines the status of the internal memory upon receiving the message from the message receiver, and if the internal memory has an insufficient reserved space, automatically stores the received memory in the external storage medium.

7. The message processing system according to claim 6, wherein, if a message exists in the buffer, the message processor locks an existing buffer pointer which indicates address information of the buffer, and generates a new buffer pointer.

8. The message processing system according to claim 7, wherein the message processor allocates a new buffer to the locked existing buffer pointer, and unlocks the existing buffer pointer to store the message in the new buffer.

9. The message processing system according to claim 7, wherein the message processor processes a message existing in the buffer by referring to the new buffer pointer, and processes the message stored in the external storage medium by sequentially reading the stored message.

10. A message processing method using an external storage medium, comprising the steps of:
(a) examining a status of an internal memory of a buffer upon receiving a message, and if the internal memory has an insufficient reserved space, automatically storing the received message in the external storage medium; and
(b) processing the message stored in the external storage medium by loading the stored message in the internal memory;

wherein step (b) comprises:

when a message exists in the buffer, locking an existing buffer pointer which indicates an address information of the buffer, and generating a new buffer pointer;

allocating a new buffer to the locked existing buffer pointer, and unlocking the existing buffer pointer so as to store the message in the new buffer; and processing the message in the buffer by referring to the generated new buffer pointer, and then processing the message stored in the external storage medium by sequentially reading the stored message.

* * * * *